US007003143B1

(12) United States Patent
Hewitt et al.

(10) Patent No.: US 7,003,143 B1
(45) Date of Patent: Feb. 21, 2006

(54) TOMOGRAPHIC MICROSCOPE FOR HIGH RESOLUTION IMAGING AND METHOD OF ANALYZING SPECIMENS

(76) Inventors: Charles W. Hewitt, 1501 Little Gloucester Rd., U-10, Blackwood, NJ (US) 08012; Edward J. Doolin, 443 Fern Ave., Westmount, NJ (US) 08108; John Kesterson, 1104 W. Briggs Ave., Fairfield, IA (US) 52556; Peter D. Lauren, 10058 Quantrell Row, Columbia, MD (US) 21746; Gary Greenberg, 520 Washington Blvd. PMB 422, Marina Del Rey, CA (US) 90292

( * ) Notice: Subject to any disclaimer, the term of this patent is extended or adjusted under 35 U.S.C. 154(b) by 446 days.

(21) Appl. No.: 09/704,508

(22) Filed: Nov. 2, 2000

Related U.S. Application Data

(60) Provisional application No. 60/163,166, filed on Nov. 2, 1999.

(51) Int. Cl.
*G06K 9/00* (2006.01)
(52) U.S. Cl. ............... 382/128; 250/461.2; 250/201.3; 359/346; 359/368; 359/376
(58) Field of Classification Search ............... 382/131, 382/129, 133, 134, 128, 154, 284; 250/311, 250/201.3, 461.2; 600/443; 359/346, 368, 359/376
See application file for complete search history.

(56) References Cited

U.S. PATENT DOCUMENTS

| | | | | |
|---|---|---|---|---|
| 4,360,885 A | * | 11/1982 | Edgar | 382/131 |
| 5,345,333 A | | 9/1994 | Greenberg | 359/389 |
| 5,579,360 A | | 11/1996 | Mottaleb | 378/37 |
| 5,594,235 A | * | 1/1997 | Lee | 250/201.3 |
| 5,621,532 A | * | 4/1997 | Ooki et al. | 356/444 |
| 5,647,018 A | * | 7/1997 | Benjamin | 382/128 |
| 5,810,008 A | * | 9/1998 | Dekel et al. | 600/443 |
| 5,814,820 A | * | 9/1998 | Dong et al. | 250/458.1 |
| 5,866,905 A | * | 2/1999 | Kakibayashi et al. | 250/311 |

FOREIGN PATENT DOCUMENTS

| | | |
|---|---|---|
| EP | 0833181 | 4/1998 |
| FR | 2639439 | 11/1988 |
| WO | WO 99/42949 | 8/1999 |

OTHER PUBLICATIONS

Satoshi Kawata, "Laser computed-tomography microscope", Applied Optics, vol. 29, No. 26, Sep. 1990, pp. 3805-3809.*
Satoshi Kawata, "Three-dimensional transfer-function analysis of the tomographic capability of a confocal fluorescence microsope", Journal of Optical Society of America, vol. 7, No. 3 Mar. 1990, pp. 522-526.*
Monks, et al., Three Dimensional Visualization of Proteins in Cellular Interactions Proceedings of the 7th Annual IEEE Visualization 96 (1996) 363-366 & 503.

* cited by examiner

*Primary Examiner*—Jose L. Couso
*Assistant Examiner*—Tom Y. Lu
(74) *Attorney, Agent, or Firm*—Klauber & Jackson LLC

(57) ABSTRACT

Tomographic methods and device for obtaining images of microscopic specimens such as Pap smears.

10 Claims, 4 Drawing Sheets

TOMOGRAPHIC MICROSCOPE FOR HIGH RESOLUTION IMAGING AND METHOD OF ANALYZING SPECIMENS

This application claims the benefit of U.S. provisional application Ser. No. 60/163,166 filed Nov. 2, 1999.

FIELD OF THE INVENTION

The present invention relates to a computerized tomographic microscope for evaluating specimens at high-resolution and a method of analyzing a specimen with use of a high-resolution three-dimensional reconstruction.

BACKGROUND OF THE INVENTION

The proper evaluation of pathological specimens is of high importance to public health. An example is the detection and diagnosis of cancer. Often this is performed by a screening mechanism in which a cell specimen is obtained from a patient and detected under a microscope for abnormalities. While screening tests have decreased mortalities associated with cancer by preventing the development of invasive disease, it is nonetheless dependent on the ability of a technician viewing a specimen under a microscope to detect abnormal cells and structures in thick specimens or thick clusters of cells. Success depends in part on the images presented for evaluation. When the image is viewed through a conventional high-powered light microscope, the thickness and complexity of the specimen, the nature and concentration of the stain, the microscope optics objective and the illumination source all influence what is seen.

The conventional evaluation of pathological specimens using standard compound high-powered microscopes has a number of shortcomings. For example, the standard compound microscope using axial illumination is particularly ill-suited for clusters of cells. Thick or overlapping images can be distorted because of diffraction of the light and because of absorption by thick sections. Moreover, depth of focus is greatly reduced at high power, and it is difficult to visualize structures above or beyond a thin focal plane. Evaluation is made difficult by deficiencies in resolution, contrast, light penetration, and sharpness of image. As a consequence of the difficult and subjective nature of the test, there is a continuing problem with false negative readings and ambiguous readings in various cytopathology specimens. An example includes the Pap smear where a diagnosis is known as "atypical squamous cells of undetermined significance" (ASCUS).

U.S. patent application Ser. No. 09/104,133 (hereinafter the '133 application), discloses that oblique or multiple oblique illumination (MOI) of a specimen (or the oblique illumination equivalent achieved by tilting the specimen), especially a cytopathology specimen such as cervical Pap smear, is superior to axial illumination for purposes of ascertaining cellular detail of diagnostic significance. Oblique or MOI illumination can be performed using the microscope described in U.S. Pat. No. 5,345,333 (Greenberg). As described in the '133 application, MOI provides dramatic capabilities for penetrating thick cell clusters of cytopathology specimens and assessing individual cellular detail within clusters. Microscopic observation of thick cell clusters proved difficult as is well known to those skilled in the art using conventional axial illumination, as interpretation within the flat field is suboptimal. MOI provides a number of advantages, including increased intensity of light penetration through a wide range of focal planes within the clusters, higher resolutions, higher sharpness of the image, and the stereo view surprisingly and unexpectedly allowed for three-dimensional information to be realized. This proves invaluable for assessing cells and cellular detail in thick specimens or thick cell clusters.

It would be highly advantageous if, rather than depend solely on a human observer, the results of MOI-mediated microscopic examination could be processed by a computer to provide 3-dimensional images amenable to further computerized analysis for cellular detail. To achieve this goal, however, a number of significant challenges must be met. One challenge results from the nature of the image the computer "sees" and the relationship of that seen image to the actual image in the specimen under the microscope. The image seen by the computer is the sum of minute square (or dot) individual image components, pixels, regularly spaced over a flat surface. Each pixel stores, in computer-readable form, the frequency and intensity of light that impacted that pixel. Because, however, microscopes cannot be perfectly focused, the pixels seen by the computer will have received light not only from the focal plane of interest (i.e., a "virtual" thin slice of the specimen), but also specimen components just below and just above that plane. The present invention provides a method for "cleaning up" such images so that they more closely represent only the image in the focal plane of interest. To accomplish this goal, the computerized process uses a novel algorithm and analyzes a plurality of images of a single specimen plane, each image taken using a different source of oblique illumination. The resulting images can be stacked by the computer to provide a 3-dimensional image of the specimen, which image can either be displayed on a computer monitor or be further analyzed by a computer to quantitatively characterize components of cells in the specimen.

SUMMARY OF THE INVENTION

In one general aspect, the invention is a method for evaluating a specimen comprising the steps of:
(1) obtaining a plurality of images of the specimen along a plurality of planes defining the thickness of the specimen, in which the plurality of images comprise at least two images taken at different angles relative to each other; and
(2) cross-correlating information obtained from the angled views to produce a single output image for the each one of the plurality of planes to define a plurality of confocal emulated images.

In one embodiment, the process comprises a step (3):
(3) stacking the plurality of confocal emulated images to produce a three-dimensional reconstruction of the specimen.

It is preferred that, in the method, for all the images are obtained in a given plane and plane area, the locations of said plane and area relative to said specimen are the same at the time all images are obtained.

It is also preferred that, in step (1), each image is obtained on a surface comprising a regular arrangement of pixels, each pixel capable of representing absorbed light or emitted light (fluroescence) so that information on both the frequency and intensity of the light absorbed or emitted is computer readable.

In a preferred embodiment of the method, in step (2), the information cross-correlated comprises absorbed or emitted light frequency information and intensity for each pixel. Most preferably, the cross-correlation comprises a cross correlation of information between a linearly arranged sequence of pixels from each image, the sequences at least partially overlapping. Furthermore it is preferred that the cross-correlation will, for purposes of constructing a confocal emulated image, score as undesirable that specific image information that is displaced in one image relative to the other and will score as desirable that specific image information that is not displaced in one image relative to the other, and further for purposes of constructing a confocal emulated image will tend to retain desirable information and to eliminate undesirable information.

In another general aspect, the invention is a tomographic microscope (Illustrated in FIG. 1 and in part in FIG. 2) for evaluating a specimen, said microscope comprising:

(a) a means for obtaining a plurality of images of the specimen along a plurality of planes defining the thickness of the specimen, in which the plurality of images comprise at least two images taken at different angles relative to each other;

(b) a means for cross-correlating information obtained from the angled views of step (a) to produce a single output image for the each one of the plurality of planes comprising a confocal emulated image for each one of the plurality of planes to define a plurality of confocal emulated images.

The means for (a) and (b) are illustrated by FIGS. 1, 2, and 3, in combination with the computer algorithms described herein. The computer algorithms are implemented by the computer shown in FIG. 1. Similarly all other embodiments of the device, means described therein and computer algorithms related thereto can be understood by reference to FIGS. 1–4 and the algorithms described herein.

In a preferred embodiment, the device further comprises a means for stacking the plurality of confocal emulated images to produce a three-dimensional reconstruction of the specimen.

In a preferred embodiment, the means for cross-correlating information implements the cross correlation for data obtained where all the images are obtained in a given plane and plane area, and the locations of said plane and area relative to said specimen are the same at the time all images are obtained.

It is also preferred that, in the means for obtaining a plurality of images of the specimen, each image is obtained on a surface comprising a regular arrangement of pixels, each pixel capable of representing absorbed light or emitted light (fluorescence) so that information on both the frequency and intensity of the light absorbed or emitted is computer readable.

In a preferred that the means for cross-correlating information implements the cross correlation for data obtained where the information cross-correlated comprises absorbed or emitted light frequency information and intensity for each pixel.

Most preferably, the means for cross-correlation cross correlates information between a linearly arranged sequence of pixels from each image, the sequences at least partially overlapping.

It is preferred that the means for cross-correlation will, for purposes of constructing a confocal emulated image, score as undesirable that specific image information that is displaced in one image relative to the other and will score as desirable that specific image information that is not displaced in one image relative to the other, and further for purposes of constructing a confocal emulated image will tend to retain desirable information and to eliminate undesirable information.

In another aspect the invention is electronically, magnetically, or electromagnetically stored data generated by a method of this invention.

BRIEF DESCRIPTION OF THE DRAWINGS

The advantages, nature and various additional features of the invention will appear more fully upon consideration of the illustrated embodiments now to be described in detail in connection with the accompanying drawings. In the drawings.

It is to be understood that these drawings are for purposes of illustrating the concepts of the invention and, except as noted below in the description are not to scale.

DETAILED DESCRIPTION

Applicants have discovered a device and method for performing high-resolution tomographic microscopy based on angled views, images or light paths, computerized confocal emulation, and high-resolution three-dimensional image reconstruction. With this invention, detail in cell clusters or thick specimens such as obtained from Pap smears can be accurately reconstructed in three-dimensions at high resolution. Also, as another example, neurons and dendrites could be likewise reconstructed in a specimen consisting of thick brain tissue (e.g., having a thickness of 30 to 40 microns). Out of focus haze is dramatically eliminated, and nuclear and cytoplasmic detail may be selectively obtained with use of a color segmentation algorithm. The invention comprises creating high-resolution animation sets of rotating cell cluster volumes to produce significant increases in sharpness, contrast, and resolution.

Figure 1:
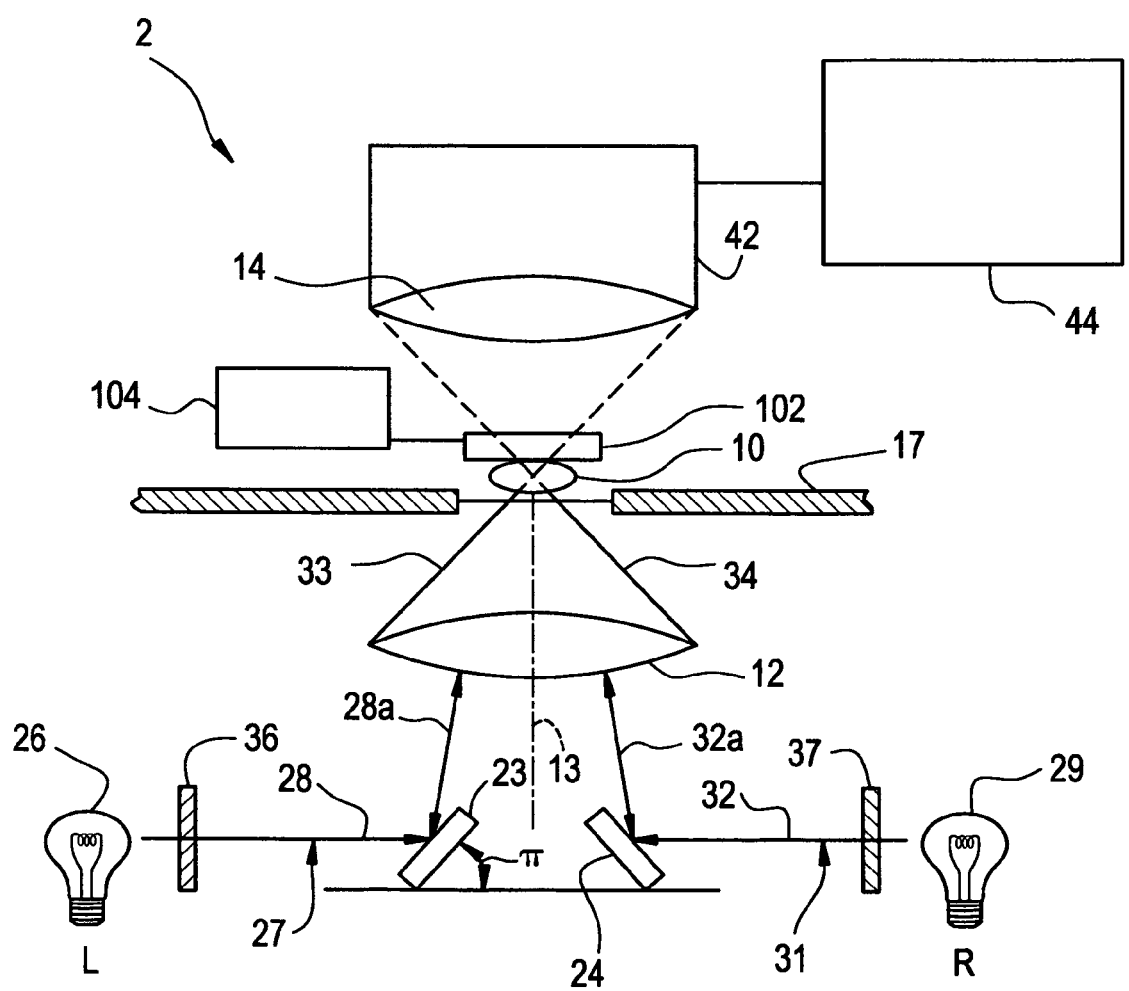
FIG. 1 is a schematic illustration of one embodiment of the computerized tomographic microscope including use of a mechanism for performing multiple-beam oblique illumination.

Referring to the drawings, FIG. 1 schematically illustrates the computerized tomographic microscope including use of an optical system for multiple oblique illumination (MOI). Such MOI systems are described in greater detail in U.S. Pat. No. 5,345,333 which is incorporated herein by reference. Microscopes employing oblique illumination or oblique view (known as the 3-D microscope head) are commercially available from Edge 3-D Imaging, LLC, Philadelphia, Pa. Single beam oblique illumination can also be achieved by rotation and tilting of the stage or of the condenser in an axially illuminated microscope.

One can, for example, take a microscope created for MOI and utilize the camera port on the microscope to take images for the algorithm of the present invention. To that end, one uses one oblique angle light source at a time to create an image and then, using the algorithm described herein, combines images from different light sources to create the final image. An additional possibility is to use two polarized light sources, the light from the sources distinguishable based on their polarization. The polarized light from both sources can be used simultaneously to illuminate the specimen.

It follows that, although the tomographic microscope works well with MOI, MOI is not necessary for the invention. Another traditional image capturing device may be used including a traditional axial microscope, the important consideration being that the image-capturing device must be capable of obtaining views of the specimen at different angles, e.g., by rotation or tilting of the specimen, the light paths, by altering one or more light paths used in the device, or with polarized light.

The invention can be further understood by referring to FIG. 1 which figure illustrates a device 2 of this invention. In that Figure, a cytopathology specimen 10 is shown mounted on a slide 102. Schematically at box 104 there is illustrated a means for rotating the slide and specimen relative to the light beams 33, 34 of the MOI apparatus. The specimen should have a thickness that permits visualization of the specimen and the acquisition of images from a plurality of angles. The thickness of the specimen will depend upon the magnification of the optical system. For example, even a single cell can have the necessary thickness at 1000× magnification under conditions of bright field or fluorescence light microscopy. However, in most cases the specimens will have a thickness ranging from greater than 4 to 5 microns or up to 100 microns or more. This same principle of tilting the view or illumination source could apply to electron microscopy as well. This could include both scanning or transmission electron microscopy. This will apply to any tilted or oblique images so obtained.

In the illustrated optical system of FIG. 1, which uses multiple oblique beams, a plurality of beam path shifters such as mirrors 23 and 24 are disposed off the optical axis 13 of condenser 12 to permit the system to operate with plural independent illuminating beams to the condenser lens. A first light source 26 directs a light beam 27 along a first beam path 28 that includes mirror 23. Similarly, a second light source 29 directs a second light beam 31 along a second beam path 32 which includes mirror 24. Mirror 23 shifts the direction of beam path 28 to path 28a passing through condenser 12. Mirror 23 is disposed a distance radially away from condenser axis 13 and at an angle $\pi$ relative to the incident light beam 27 which produces the exit beam path 33 from condenser 12 to emerge from the edge of the lens at the maximum angle which includes the objective 14. (See U.S. Pat. No. 5,345,333 for an example of how to achieve variable $\pi$) Similarly, mirror 24 shifts the direction of beam path 32 to path 32a which includes the condenser 12. Mirror 24 operates in precisely the same way as mirror 23 to produce the desired exit beam path 34 from condenser 12. Specimen 10, which can include clusters of cells or other structures, is disposed at the intersection of the oblique beams 33 and 34. The beams projecting through the specimen enter the objective 14 and the specimen can be captured by a device 42 and digitally processed as by computer 44.

Figure 2:
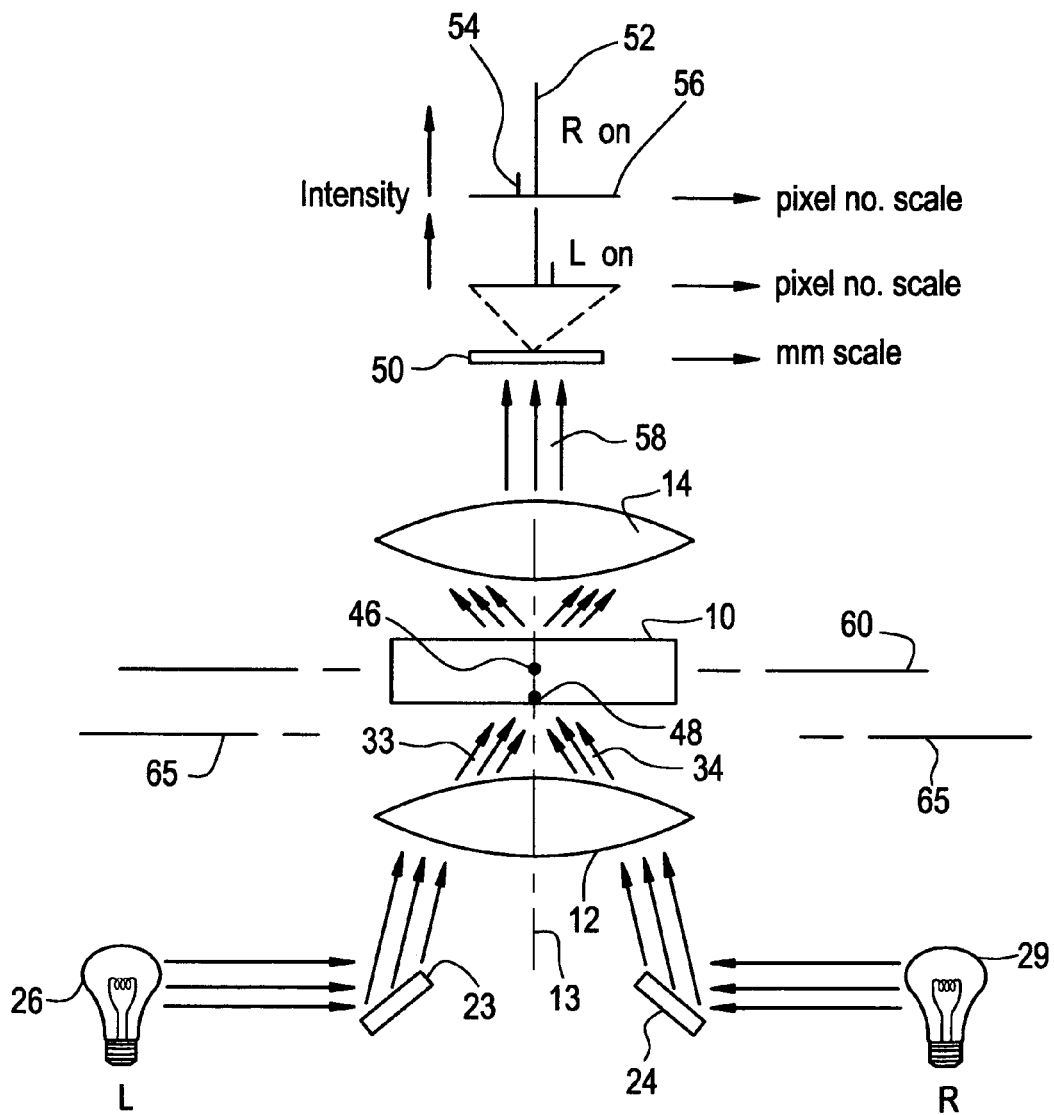
FIG. 2 is a schematic illustration of part of the microscope of FIG. 1 plus a schematic representation of a pixel intensity pattern created using the microscope.
Figure 3:
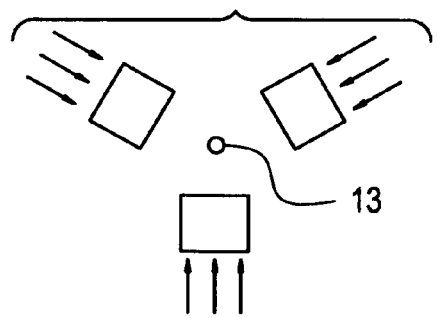
FIG. 3. Example of multiple mirror arrangements relative to the main axis of the optical system: Three mirror arrangement.

According to the invention, the apparatus obtains a plurality of images along a first plane of the specimen. In one embodiment, two images are obtained at angles of view taken at 180° relative to one another (FIGS. 1 and 2). These two images are cross-correlated with use of an algorithm, described in more detail below, to obtain a thin plane of detail common to both images. In another embodiment, three images are obtained at angles of view taken at 120° relative to one another (See FIG. 3). These images are cross-correlated with use of an algorithm, described in more detail below, to obtain a thin plane of detail common to all three images (e.g., center, right and left, or three 120° images) and provide a confocal emulated image. In another embodiment, an image is obtained at the center of the specimen, as shown, and then the means 104 for rotating the specimen around the main optical axis (or other means for obtaining angled views) is activated to obtain images to the right and left of the specimen center.

Although use of two or three images is noted above, it should be understood that a greater number of images can be obtained, and even an indefinite number of angled views or images is possible. However, at each plane of the specimen there should be views taken from at least two different angles. It is contemplated that the best results will be achieved when images are obtained from 2 to 36 angles relative to the specimen at each plane. The computerized microscope will obtain an output (confocal emulated) image for each one of the planes, and the process repeated for a multiplicity of planes along the depth of the specimen. The output image for each plane is stacked to obtain a three-dimensional reconstruction of the specimen. The three-dimensional reconstructed image is displayed on monitor 44. This dramatically improves resolution in the third dimension or z-axis in reconstruction.

The significance of the optical system and procedure illustrated in FIG. 1 can be further appreciated by referring to FIG. 2. The purpose of FIG. 2 is to illustrate that the relationship between the macroscopic features of the device and the microscopic features within the specimen 10. FIG. 2 makes some modifications of elements of FIG. 1.: The beams 32, 34 and 58, and related components of the beam path are represented as three parallel arrows instead of one to emphasize the macroscopic width of the beams. The specimen 10 is artificially enlarged in FIG. 2, so that microscopic balls 46 and 48 of equal size can be schematically represented. Generally, a microscopic element of interest in a specimen will not be a perfect ball, but they are used here for illustrative purposes.

The microscopic balls 46 and 48 are stacked along the vertical axis through which the beams of light pass on their way from the condenser 12 to the objective 14. Ball 46 is in the focal plane 60 of interest, whereas ball 48 is slightly below the focal plane of interest. Because ball 48 is slightly below the focal plane of interest, it will cause a smaller amount of light to impinge on the pixel-coated surface 50 than the ball 46 will. Furthermore the light due to ball 48 will impinge at a pixel(s) slightly displaced from that were the light due to ball 48 impinges.

The differences in the effects of balls 46 and 48 on the light absorbed by the pixilated surface 50 are shown at the top of FIG. 2. The intensity for the situation "R on" shows that the intensity of light due to the focal plane ball 46 has a greater intensity 52 (the height of the line 52 is proportional to the intensity) than the intensity 54 due to the ball 48. Furthermore, the light from ball 48 impinges on surface 50 slightly to the left of where the light from ball 46 impinges. (Note the scale of the horizontal axis 56 of the diagram is in pixels whereas that of the surface 50 is of the order of mm. In essence, the Intensity vs. pixel diagram provides an exploded representation of a small portion of the surface 50) If the left light L is on, but the right light R is off, then the pixel positions of the light from the balls is reversed. This reversal is seized upon by the computer algorithm to predict that the intensity 54 is due to an out of focus component. Analogous reversals would be seen for a ball slightly above the focal plane ball 46.

Figure 4:
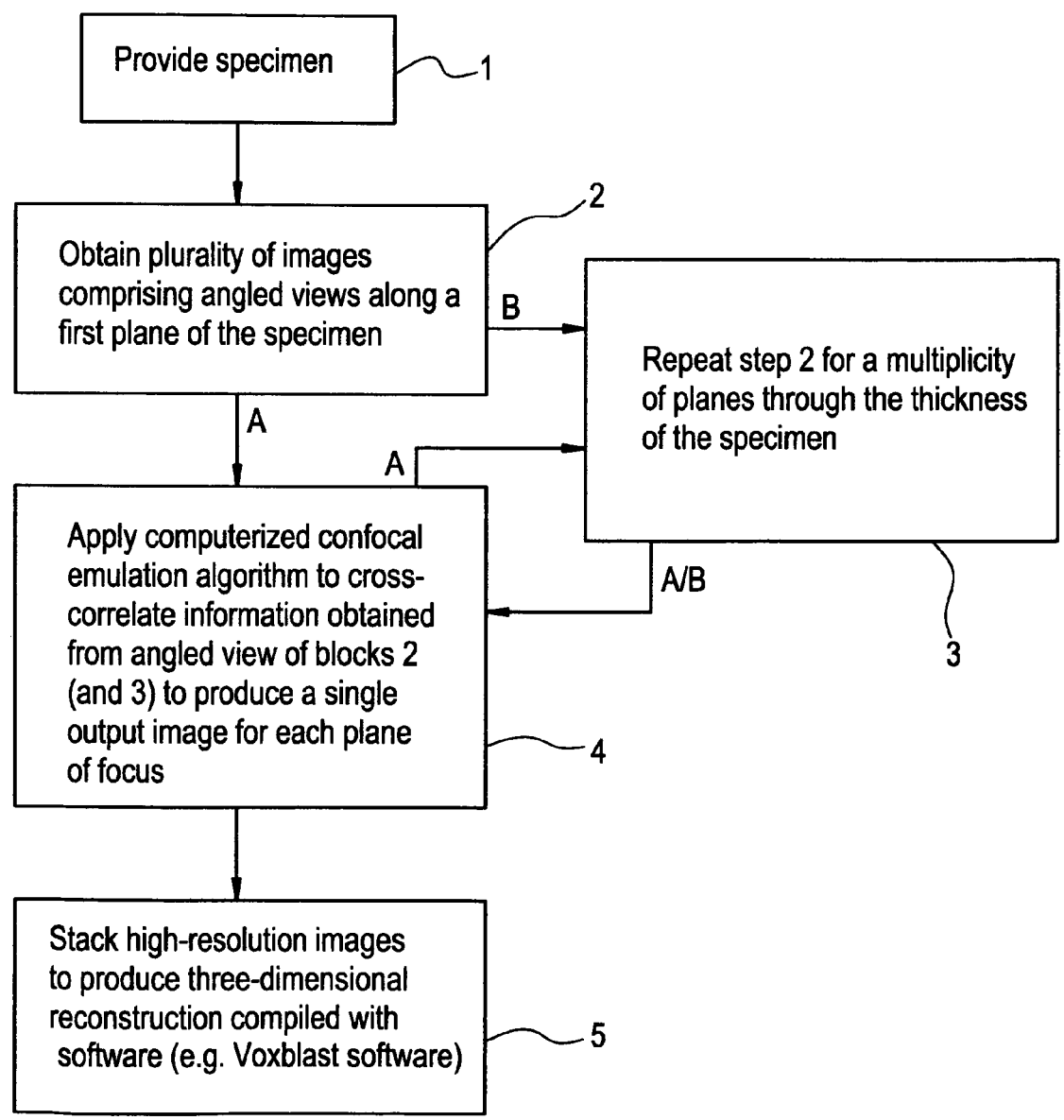
FIG. 4 is a block diagram showing the steps of the method of analyzing a specimen with use of the tomographic microscope and a high-resolution three dimensional reconstruction.

The instant invention also comprises a method of analyzing a specimen with use of the tomographic microscope and a high-resolution three-dimensional reconstruction. An overview of the method is illustrated in block diagram of FIG. 4. A first step of the method involves providing the specimen which as aforementioned is relatively thick, depending upon the magnification that is used to view the specimen. A next step, in block two, is to obtain a plurality of images comprising angled or tilted views along a first plane of the specimen. Preferably this step is performed with a MOI apparatus although other image-acquisition apparatuses could be used as well, providing an angled or tilted or polarized view or illumination.

A next step (block4) comprises applying a computerized confocal emulation algorithm to cross-correlate information obtained from the angled views to produce a single output image for each plane of focus of the specimen. Essentially, with the algorithm, information that is not common to each angled view is omitted and a plane of detail is provided that is common for all angled images. Thus, a high-resolution image, avoiding haze or other out-of-focus information is produced. Blocks 2 and 4 are repeated for a multiplicity of planes through the thickness of the specimen. The order in which the steps are performed is not critical. For example, a plurality of views across a first plane may be taken, a confocal emulated image for the first plane obtained (e.g., with an algorithm), and then a plurality of views taken across a second plane, a confocal emulated image obtained for the second plane, and so forth (e.g., following arrows A of FIG. 4). Alternatively, a plurality of angled views may be taken across the first, second, third, and so on planes (e.g., following arrow $B_1$ of FIG. 4), and then the confocal emulated image determined for each one of the focused planes after all the views have been imaged (arrow $B_2$). Another approach would be to follow a combination of these methods, e.g., following both arrows A and B of FIG. 4.

Once the high-resolution images are obtained for each plane of focus, the images are stacked (e.g., one image placed on top of another) and software applied (e.g., Voxblast software available from Vaytek, Inc. Fairfield, Iowa, and others) to produce a three-dimensional reconstruction of the specimen. The invention results in greater resolution, more accurate measurements, and provides superior results for automated procedures, as all the information input into the computer in performing the reconstruction comprises high-resolution information.

Computer Algorithm for the Creation of High Resolution Images from Serial Sets of Stereoscopic Images The objective is to enhance material in the focal plane of each section while suppressing or eliminating material in proportion to the extent to which it is out of focus The two most obvious parameters that vary with focus are lateral displacement between the left and right images of a stereoscopic pair and the strength of high frequency information associated with each visible object. Any operation that enhances high frequency information at the expense of low frequency information (e.g. high pass filtering, unsharp masking) will enhance in-focus material while suppressing out of focus material. The inventors have already observed that simple high-pass filtering has been very effective at removing large, dense out-of focus objects while enhancing small, pale in-focus objects. One disadvantage of high-pass filtering is that large, homogeneous in-focus objects may be suppressed. However the edges should still be sharp and therefore enhanced. Also, projections of in-focus objects should contain high frequency information within the object edges although some of this may be obscured by low-frequency contributions from out-of-focus planes in the case of thick objects. It is not common for in-focus projections of biological material would have homogeneous interiors. Thus high-pass filtering was considered for the algorithm.

It was found that more reliable results may be obtained from the parallax associated with stereological pairs of images of objects at different focal levels. The closer an object is to the focal plane, the less the displacement of the object between members of the stereoscopic image pairs. The simplest way to take advantage of this is to divide the product of the left and right image by the difference image. However, there are a number of situations where this will not work properly:

Large out-of-focus objects may still cause a large number of pixels to be of high density in both images. This would be caused by the overlap which is the difference between the lateral width and lateral displacement of the object.

Different small out-of focus objects may move into each other's positions resulting in the corresponding pixels being dense (and possibly of similar density) in both images. This is more problematic for the product image than for the difference image since high density pixels would be at the same wrong location in both images but it is less likely that the densities would be as similar as for the case where an in-focus object occupies the same pixels in both images.

Larger out-of-focus objects may move to cover smaller in-focus objects. This would cause a problem with the difference image but not with the product image.

Correlation analysis. Another means of analyzing object displacement is through correlation analysis. This approach has the advantage of being able to analyze pixels in relation to their neighborhoods instead of in isolation. Since displacement between images is 1-dimensional, 1-dimensional correlation analysis appears to be appropriate. A sampling window of a certain length is used to obtain sample vectors from groups of pixels in corresponding locations in each of the two images. A corresponding vector pair (CVP) consists of two vectors, one from each of the left and right images, comprising a contiguous string of pixels with the same coordinates in each image. Cross-correlating these vectors provides as measure of the similarity between corresponding (1-D) neighborhoods in the two images. The result of cross-correlation is a correlation vector.

If the CVP members are normalized (divided by their respective norms) prior to cross-correlation then the highest member value in the resulting correlation vector will be 1.0 if the non-zero elements of the CVP members are identical and have the same configuration. In this case, the nonzero elements of the correlation vector will also be symmetric about the peak value. If the nonzero elements also occupy the same pixel locations in both CVP vectors, the peak value will be the central element of the correlation vector. If the non-zero elements are displaced between the CVP members then the peak value in the correlation vector will be displaced in proportion to this. However, if the non-zero elements are identical and have the same configuration apart from the displacement then the peak value of the correlation vector will be 1.0 and the non-zero elements will be symmetric about this maximum value. If the non-zero elements differ between the CVP members and/or they have different configurations then the maximum value of the correlation vector will be less than 1.0 and will be proportional to the similarity between the configurations of the non-zero values.

If the CVP members are not normalized prior to cross-correlation, then the values of the vector elements are reflected in the elements of the correlation vector. Hence cross-correlation of dissimilar vectors with large elements will yield vectors with larger elements than cross-correlation of identical vectors with small elements. Hence normalization is required to decouple similarity from intensity. Normalized correlation measures the similarity between the relative, rather than absolute, values of vector elements. It is therefore theoretically possible that high correlation could be measured between an object in one image and background in the other. However this would require high similarity in the configuration of the relative values of elements of the vector sampling the object in one image and the background in the other. The probability of this is low and falls with the size of the sampling window. Hence the sampling vectors should be normalized prior to cross-correlation. In analyzing the correlation vector, displacement of the peak from the center indicates displacement of the object between sample images. Since this displacement indicates displacement of the object from the focal plane, it was considered appropriate to use only the center element of the correlation vector when measuring the similarity between samples. This allows for a large sampling window to be used without high correlation being interpreted from an out of focus blob being present in the sample from both windows.

Correlation analysis is expected to be quite successful in identifying small objects that are in focus. It would be less successful with objects that are large relative to the sampling window since, when such objects are out of focus, the pixel values will change smoothly and slowly over several windows. Hence, high correlation would tend to be measured between vectors that do not correspond to the same part of the object. It is also possible, although much less likely, that a single small similar object may be seen at the same location in both CVP members but they may be different out-of-focus objects. In this case, high correlation will be interpreted but inappropriately. The risk of this problem may be reduced by using a larger sampling window and/or using 2D correlation. However, the effect of using one or both of these approaches would be to reduce the probability of this problem arising and not precluding it. Also, small out-of-focus objects would tend to have a similar (Gaussian) configuration in 2D so using 2D analysis is expected to be less preferable for dealing with this problem.

Optical flow approach. Since lateral displacement is important in identifying in-focus objects it was considered appropriate to use optical flow for this purpose. The optical flow approach incorporates and extends the principles of correlation analysis. A 2D optical flow image would consist of pixels each representing the displacement vector from one image to the next. For example, an optical flow image from the left image to the right would consist of vectors each describing the magnitude and direction of the movement of whatever is at the pixel's coordinates in the left image to wherever it will be located in the right image. Such vectors could be fully defined by a complex image (where each pixel has a real component and an imaginary component). The magnitude of displacement would be the hypotenuse (square root of the sum of the squares) of the real and imaginary component. The direction would be the arctangent of the imaginary component divided by the real component. However, this is more than is required for this application since movement is confined to one dimension and it is only the magnitude that is required to determine the distance of the object from the focal plane. If it is desirable to determine whether the object is above or below the focal plane, this information may be stored by applying a positive or negative sign (representing the ID direction) to the optical flow pixel's magnitude. However, such information is not germane to the present objective. Hence, all that is required for each pixel of the optical flow image is the magnitude of the displacement. The smaller this value, the more in-focus the object in that part of the original image will be.

An optical flow image can be easily obtained using ID cross-correlation. Since movement (between the left and right image) is confined to the horizontal axis, the optical flow image is obtained by taking ID window samples of the left image ("left image" here means an image taken from lamp on the right) and cross-correlating each sample with every possible window sample (taken after each of a series of 1 pixel shifts of the window relative to the window for the left image) on the same row of the right image. Window samples in the left and right image that overlap therefore are obtained by 1-pixel incremental sampling. Samples are normalized prior to cross-correlation. The sample in the right image, for which the middle element of the correlation vector is highest, is taken to be the matching window in the right image. The magnitude of the displacement (number of required pixel shifts to obtain overlap) from the window in the left image to the matching window in the right image is then assigned to the optical flow pixel with coordinates corresponding to the middle element of the sample window in the left image. One problem with this is that it is the highest valued element, rather than the middle element that will make the greatest contribution to the cross-correlation vector. Hence the displacement vector mainly reflects the displacement of the highest-valued element. Therefore, it is preferable that the sampling window is not so large as to incorporate more than one object at a time.

Optical flow is expected to be a superior approach to simple correlation since correlation could be high with similar objects but flow tries to match particular objects and record the displacement. It is also possible that image flow could be extended to get depth information. Another advantage of optical flow is that one can control the depth of field by setting a flow magnitude threshold. Objects associated with flow above this threshold are removed.

One dimensional correlation analysis is done, for example, using a correlation window that is 1 pixel wide in the "Y" direction and 10 pixels wide in the "X" direction.

The gray scale pixel system is a useful one for implementing the invention, but any other pixel system (e.g. RGB) can also be used.

Once each individual plane of the image is constructed, known algorithms and software can be done to combine (stack) the images into a 3-dimensional image. Similarly known algorithms and software can be used to either project those images on a computer monitor or calculate the volume of entities (e.g. a cell nucleus) within the image. Volumes of specific entities can be calculated, for example, by identifying their boundaries by known algorithms, calculating the cross-sectional area of the entity in a given plane, and integrating the areas over all the planes.

To improve both viewability and/or computer generated images, the images can be inverted (black <-> white) to insure that the objects are brighter than the background.

It is also helpful to median filter the optical flow magnitude field.

It is also helpful to modify the left image as follows: If a pixel has a value greater than a user-specified maximum value, it is set to the highest value (255 for 8-bit images). If a pixel has a value less than a user-specified minimum value or the corresponding pixel in the OFMF image is greater than the user-specified maximum, it is set to zero. In other cases, the pixel is left unchanged General Applications The instant invention has many applications. The invention may be applied for any clinical analysis of a specimen having a thickness such as a cluster of cells or even a single cell at high magnification (100×). One application involves analysis of PAP smears. It can be used to obtain quantitative information on such diagnostically relevant intracellular information such as nuclear volume, cytoplasm volume, microtubule distribution, cell shape, and the color of dye-stained cytoplasm.

The results of the computer analysis may also be used as the basis for 3-dimensional representation of cell and its discrete internal organelles, such as its nucleus, on a computer monitor.

Three dimensional volumes can be calculated, for example, by identifying the boundary of interest and calculating the cross sectional area of individual slices (planes) of the volume and then integrating over all planes—all of which can be done with well known algorithms.

EXAMPLES

Optical sections of thick (10 to 40 micron) cell clusters from cervical Pap smears were captured sequentially at 400× using various oblique light paths. Images were then processed with a computer algorithm to produce confocal emulation. Three-dimensional reconstructions were then complied with the high-resolution images using Voxblast software (available from VayTek, Inc. of Fairfield, Iowa). Cells were color segmented, and various volumetric characteristics were emphasized.

Figure 5:
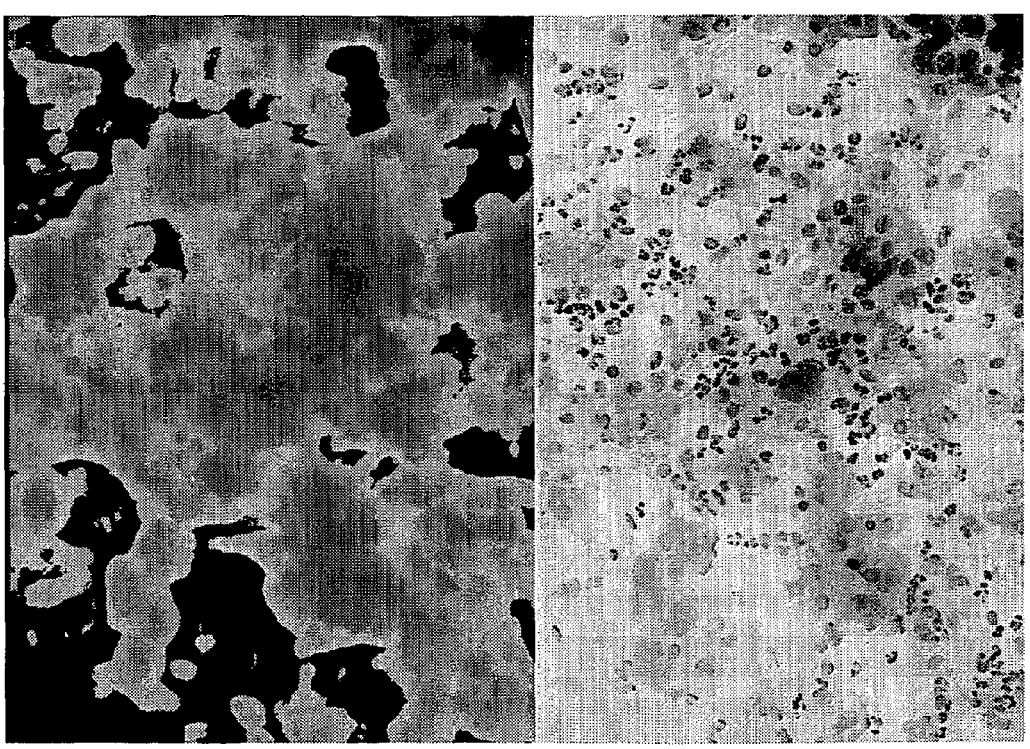
FIG. 5. Images of a Pap Smear sample. The left panel is the image taken at one oblique angle. The right panel is the image created from two oblique angles (separated by 180°) by correlation analysis. The black areas represent the images created by a nuclear dye. Outlines of cell and their nuclei are evident in the right panel which is much sharper (in focus) than the image on the left.

An illustration of the result of using the method of the invention is shown in FIG. 5.

It is understood that the embodiments described therein are merely exemplary and that a person skilled in the art may make variations and modifications without departing from the spirit and scope of the invention. All such variations and modifications are intended to be included within the scope of the appended claims.

We claim:

1. A method for enhancing light microscope viewing of a light-illuminated specimen having a thickness exceeding the depth of focus of the viewing microscope to suppress imaging of objects which are displaced and out of focus with respect to a focal plane of interest, comprising the steps of:
   (1) obtaining a plurality of images of said focal plane of interest at the specimen in which said images are taken at different angles of specimen illumination relative to each other; and
   (2) applying a computerized emulation algorithm for cross-correlating information obtained from the angled views by suppressing information that is not common to each angled view and substantially retaining information for said plane that is common for all angled views, whereby to produce a single output image for the said focal plane of interest to define a confocal emulated image.

2. A method in accordance with claim 1, wherein said method is applied at a plurality of planes defining the thickness of said specimen, to thereby define a plurality of confocal emulated images.

3. The method of claim 2 further comprising the additional step of:
   (3) stacking the plurality of confocal emulated images to produce a three-dimensional reconstruction of the specimen.

4. The method of claim 2 wherein, in step (1), each image is obtained on a surface comprising a regular arrangement of pixels, each pixel capable of representing absorbed light so that information on both the frequency and intensity of the light absorbed is computer readable.

5. The method of claim 4 wherein, in step (2), the information cross-correlated comprises light frequency information and intensity absorbed by each pixel.

6. The method of claim 5 wherein the cross-correlation comprises a cross correlation of information between a linearly arranged sequence of pixels from each image, the sequences at least partially overlapping.

7. The method of claim 6 wherein the cross-correlation will, for purposes of constructing a confocal emulated image, score as undesirable that specific image information that is displaced in one image relative to the other and will score as desirable that specific image information that is not displaced in one image relative to the other, and further for purposes of constructing a confocal emulated image will tend to retain desirable information and to eliminate undesirable information.

8. A tomographic microscope for enhanced viewing of a light-illuminated specimen having a thickness exceeding the depth of focus of the viewing microscope which suppresses imaging of objects which are displaced and out of focus with respect to a focal plane of interest, comprising:
   means for illuminating said specimen at different angles of illumination relative to each other;
   means for obtaining a plurality of images of said focal plane of interest at the specimen, in which said images are taken at said different angles of specimen illumination relative to each other; and
   means for cross-correlating information obtained from the angled views by applying a computerized confocal emulation algorithm to suppress information that is not common to each angled view while substantially retaining information for said plane that is common for all angled views, whereby to produce a single output image for the said focal plane of interest to define a confocal emulated image.

9. A tomographic microscope in accordance with claim 8, further including means for obtaining said plurality of images for a plurality of focal planes of interest defining the thickness of said specimen to thereby define a plurality of confocal emulated images.

10. A tomographic microscope in accordance with claim 9, further including means for stacking the plurality of confocal emulated images to produce a three-dimensional image reconstruction of the specimen.

* * * * *